Patented Feb. 2, 1937

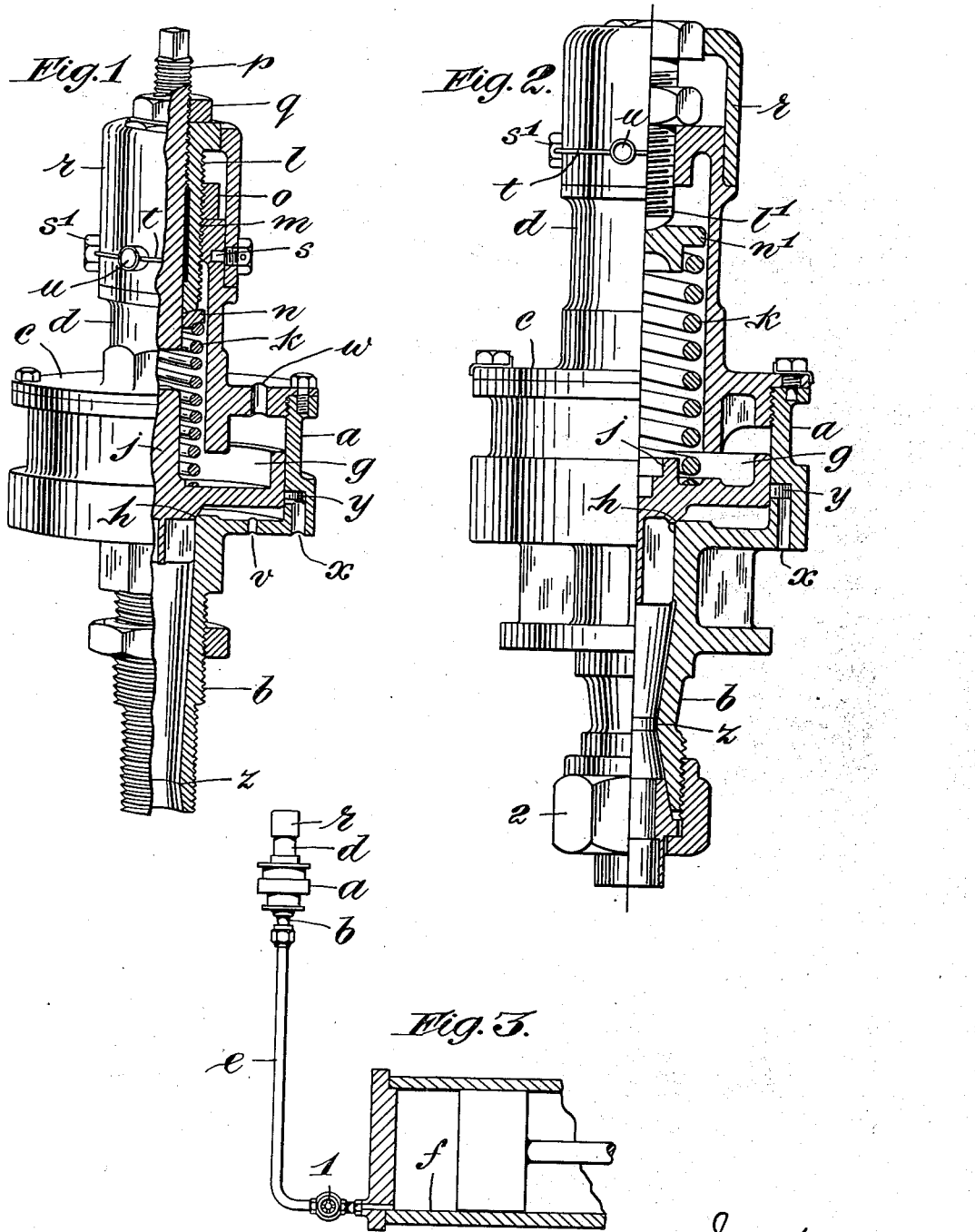

2,069,645

UNITED STATES PATENT OFFICE 2,069,645

MEANS FOR DISCHARGING WATER FROM STEAM ENGINE CYLINDERS

Cornelius Ambrose Cardew, Wahroonga, near Sydney, Australia

Application April 17, 1935, Serial No. 16,898
In Australia April 21, 1934

1 Claim. (Cl. 121—134)

This invention relates to means for discharging water from steam engine cylinders and is particularly concerned with relief devices adapted for use on locomotive engine cylinders.

It is normal practice to provide spring loaded relief valves on the end of cylinders for dealing with accumulations of water and these valves have been adjusted for blowing off at a predetermined pressure a little above boiler pressure. Nevertheless, it is a well-known fact that when steam condenses and water collects in an engine cylinder, a dangerous pressure, even several times that of boiler pressure, may suddenly develop and cause serious damage to the cylinders or their covers. Thus, in spite of the presence of relief valves on the cylinders the damage referred to has not been avoided, and special tests have shown that although the valves are in good working order, and properly set, the blow from the water seems to be so rapid that often a pressure of 1000 lb. per square inch can be registered in the cylinders without the valves opening. Even when they do open it has been found that they only discharge such a small quantity of water in the very short time that they remain open (probably for a small fraction of a second), that a very severe pounding is experienced by the piston when it returns on the next stroke.

An important object of the present invention is to provide means whereby adverse effects due to accumulation of water in steam engine cylinders can be effectively overcome.

A further object is to provide means capable of operation to avoid deleterious accumulation of water in steam engine cylinders.

Another object of the invention is to provide means whereby reliable opening of relief valves may be obtained under all normal conditions of operation.

A further object is to enable these relief valves to pass relatively large quantities of water so that accumulation may be effectively and expeditiously disposed of with consequent improvement in the operation of the engine pistons.

With these and other objects in view, this invention provides discharge means which is adapted for operation by steam acting upon an accumulation of water, and for giving a prolonged discharge under the conditions thus set up. Thus, the device is not merely responsive to hydraulic pressure arising when the clearance space becomes filled with water, as in the case of the ordinary relief valve, but is adapted for enabling steam to effect discharge of water before the clearance space is so filled thereby entirely preventing dangerous conditions from arising. One feature of the invention is the mounting of the relief valve, piston or like device at the head of a column connected to the lowest part of an engine cylinder. By this means, steam on admission to the cylinder, causes any accumulated water to be projected up the column, the combined momentum and pressure bringing about a prolonged opening of the relief device which permits escape of all water. Another feature of the invention is the formation of a throat in the column, by the reversed cones of a Venturi device, which operates for producing a relief opening adequate for the complete discharge of the water. Another feature of the invention is the provision at the head of the column of a relief valve of the so-called pop variety, the initial opening of this valve effecting the exposure to the pressure of an enlarged ram area which ensures the prolonged opening of the valve until all water has been discharged by the steam.

In order to enable the invention to be readily understood, reference is made to the accompanying drawing illustrating examples of constructions embodying these improvements, in which drawing:—

Figure 1 is a perspective view partly in vertical section of an improved relief valve embodying a shut-down or stop device.

Figure 2 is partly an elevation and partly a vertical section of a slightly modified construction in which the shut down or stop device is not present.

Figure 3 is a more or less diagrammatic view illustrating the mounting of an improved relief valve at the head of a tubular column connected with the lowest part of a steam cylinder end in accordance with these improvements.

Referring to Figures 1 and 2 the relief valve device comprises a shallow cylindrical box or casing $a$ having a tubular extension or spigot $b$ depending centrally from its bottom and a tubular extension $d$ rising from its top or cover $c$.

As shown in Figure 3, the relief valve device is connected by its lower extension or spigot $b$ with the head of a tubular column or vertical pipe $e$, the foot of the latter being connected with the lowest part of the end of a steam cylinder $f$. Advantageous practical results are attainable with a pipe of one inch bore and of two or three feet in length but other suitable dimensions may, of course, be employed.

Referring again to Figures 1 and 2, within the box $a$ a relatively large piston $g$ is vertically slidable and carries on its underside a valve $h$ adapted for seating in the mouth of the spigot $b$. On its upper surface, the piston $g$ is formed with a central boss $j$ and this latter serves for centering a loading spring $k$. In Figure 1, the loading of this spring $k$ is adjustable by means of a hollow adjusting screw $l$ which works in the screw threaded orifice $m$ of the tubular extension $d$ of the cover $c$ and presses upon a ring $n$ on the top of the spring $k$. This screw $l$ has a lock nut $o$ which screws down upon the tubular extension $d$ of the cover. An emergency shut down screw $p$ extends through the hollow adjusting screw $l$ and works in a female thread cut in the bore of the said adjusting screw $l$. This shut down screw, which may be fitted with a lock nut $q$, may be screwed down so as to press upon the boss $j$ of the piston $g$ to prevent the latter and its valve $h$ from rising, when it is desired to put the relief device out of action. Any tampering with the adjustment of the spring loading can be prevented by fitting a cylindrical cap $r$ on to the upper tubular extension $d$, so that this cap $r$ encloses the adjusting screw $l$ and its lock nut $o$. The cap $r$ may be secured by grub screws $s$ which can be sealed, as by passing a wire ring $t$ through perforations in the heads $s^1$ of the screws and sealing the ends of the ring $t$ by a seal $u$. A small steam vent $v$ may be formed in the bottom of the box $a$ and other vents $w$ may be formed in the cover of the box $a$. A relatively large number of water discharge ports $x$ are formed around the cylindrical wall of the box $a$ and these ports open into an annular space $y$ which is closed by the piston $g$ when the latter is in its normal lowered position with its valve $h$ seated.

The lower tubular extension or spigot $b$ is externally screw threaded for enabling the relief valve device to be united by suitable screw coupling means with the tubular column or vertical pipe $e$ hereinbefore referred to. The interior of the spigot $b$ is formed with reversely coned surfaces meeting at a point of constriction or throat $z$ in the bore of the spigot $b$.

The construction illustrated in Figure 2 is very similar to that described with reference to Figure 1. However, in Figure 2 a solid adjusting screw $l^1$ is used for altering the spring loading and the shut-down screw $p$ of Figure 1 is dispensed with. In lieu thereof, a shut down valve $l$ may be fitted on the pipe $e$, Figure 3, near the cylinder. In Figure 2, the rounded lower end of the screw $l^1$ rests upon a cap $n^1$ on the top of the spring $k$. In Figure 2, the vents $v$ and $w$ of Figure 1 are omitted. However, vents such as $v$ for permitting of drainage, and vents such as $w$ for preventing fluid pressure arising on the upper surface of the piston $g$, may be provided. Also, in Figure 2, pipe coupling means 2 are shown on the lower end of the spigot $b$ and rather more pronounced conical surfaces are shown meeting at the throat $z$.

When the engine is working normally, no water being present, the plain steam pressure, coming into the pipe $e$ and spigot $b$ at every admission, fails to open the relief valve $h$ because the loading of the latter is adjusted for resisting a pressure of, say, twenty pounds above boiler pressure. When water comes over in small quantities, however, a partial filling of the clearance space in the cylinder ends will occur. For instance, a superheater, and more especially a locomotive superheater, sometimes will deliver water, owing to condensation of steam therein during previous cooling down or during heating up when steam is turned on, and on starting up the engine this water may be delivered to the cylinders. This may happen during one stroke only, or during the first few strokes, after starting. In any event, however, there is no waiting for dangerous conditions to arise, as is the case when the clearance space fills and heavy hydraulic pressures develop.

As soon as the accumulation is sufficient, the next admission of steam forces the water in a column up the short length of pipe $e$, the sudden pressure of the steam on the water impelling it up the pipe with considerable velocity. The jet of water reaches the valve $h$ through the throat $z$ or Venturi device and here water traverses a small bore and emerges into a diverging cone, producing well-understood effects which result in an effective lift of the valve $h$ and piston $g$. Any steam remaining in the pipe $e$ from the previous exhaust stroke will, of course, tend to cushion the impact from the water column, but in doing so it will be compressed to a high pressure and this momentary excess of pressure opens the valve. The initial opening of the valve exposes the full area of the piston $g$ to the pressure, so that the valve $h$ is opened still further and is maintained open against the loading of the spring $k$. The piston $g$ has now uncovered annular space $y$ so that the water accumulation is completely ejected through the very adequate discharge ports $x$. In view of what has been said, it will be clear that the valve $h$ must remain open for discharge of steam and water during the complete stroke of the working piston, or the greater part thereof. The valve $h$ will reseat itself only when the pressure beneath it and the piston area is sufficiently released for permitting the loading spring $k$ to effect closure. Owing, however, to the use of the enlarged area presented by the piston, closure can be permitted to take place at a pressure of only twenty pounds to the square inch, which is sufficient to allow for back pressure in the cylinder.

The relief valve may be referred to as a double area pop-off valve as it comprises a central area which is initially subjected to pressure and an area beneath the piston $g$ which is subjected to pressure on initial opening of the valve.

With the relief device hereinbefore described, tests have proved that with a steam pressure of only forty pounds in the cylinder, the presence of water will cause the relief valve $h$ to be lifted, even although the loading of the spring $k$ of that valve has been adjusted to resist a plain steam pressure of one hundred and ninety pounds per square inch. When a locomotive is coasting or is being towed by another locomotive, there will be no steam ejection of any accumulation of water, but the latter will be discharged as with an ordinary relief valve. Experience has taught, however, that most of the damage is done when a locomotive is moving under its own power and this is entirely prevented by means constructed and arranged in accordance with this invention.

Each end of a cylinder may be fitted with its own respective column or duct and relief valve device.

I claim:—

Means for discharging water from a steam engine cylinder, comprising a double area pop-off valve disposed in an elevated position with respect to the lowermost part of the engine cylinder, a pipe connected between said valve and said lowermost part of the cylinder and rising upwardly to provide a column between said cylinder and valve, and a Venturi throat formed by opposed conical flares in said column adjacent to and before the valve.

CORNELIUS AMBROSE CARDEW.